United States Patent
Lee et al.

(10) Patent No.: US 7,779,104 B2
(45) Date of Patent: Aug. 17, 2010

(54) FRAMEWORK AND PROGRAMMING MODEL FOR EFFICIENT SENSE-AND-RESPOND SYSTEM

(75) Inventors: Dae-Ryung Lee, Seoul (KR); Sang W. Lee, Kyeonggi-do (KR); Stella J. Mitchell, Pleasantville, NY (US); Jonathan P. Munson, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 11/626,849

(22) Filed: Jan. 25, 2007

(65) Prior Publication Data

US 2008/0183304 A1 Jul. 31, 2008

(51) Int. Cl.
*G06F 15/173* (2006.01)

(52) U.S. Cl. ............... 709/223; 709/224; 709/205; 709/201; 709/204; 709/238; 706/50; 706/47; 370/310; 370/328; 370/395.21; 705/10; 705/15; 705/5; 705/7; 705/8; 700/3

(58) Field of Classification Search ............... 709/223, 709/224, 205, 201, 204, 238; 713/153–154; 370/310, 395.21, 328; 705/5, 7, 8
See application file for complete search history.

(56) References Cited

U.S. PATENT DOCUMENTS

| | | | |
|---|---|---|---|
| 4,379,497 A | 4/1983 | Hainsworth et al. ......... 180/168 |
| 6,236,933 B1 | 5/2001 | Lang ............................ 701/117 |
| 6,283,086 B1 | 9/2001 | Yamamoto et al. ........... 123/198 |
| 6,314,533 B1 | 11/2001 | Novik et al. .................... 714/39 |
| 6,330,594 B1 | 12/2001 | Swart ........................... 709/219 |
| 6,367,034 B1 | 4/2002 | Novik et al. .................... 714/39 |
| 6,490,574 B1 | 12/2002 | Bennett et al. ................. 706/47 |
| 6,631,363 B1 | 10/2003 | Brown et al. ..................... 707/1 |
| 7,250,862 B2 * | 7/2007 | Bornhoevd et al. ........ 340/572.1 |
| 2001/0029499 A1 | 10/2001 | Tuatini et al. |
| 2002/0072963 A1 | 6/2002 | Jonge |
| 2002/0129345 A1* | 9/2002 | Tilden et al. ................. 717/162 |
| 2004/0181495 A1 | 9/2004 | Grush |
| 2005/0246304 A1 | 11/2005 | Knight et al. |
| 2006/0034656 A1 | 2/2006 | Roberts |
| 2006/0064236 A1 | 3/2006 | Hayashi |
| 2006/0143439 A1* | 6/2006 | Arumugam et al. .......... 713/153 |

FOREIGN PATENT DOCUMENTS

WO WO00/45308 8/2000

* cited by examiner

*Primary Examiner*—Jude J Jean Gilles
(74) *Attorney, Agent, or Firm*—Ido Tuchman; Kenneth R. Corsello

(57) ABSTRACT

A sense-and-response system that may include a server with a rules-engine where the server may receive sensor values for rules-engine operation from a plurality of sensors. The system may further include a controller that provides controller parameters to the server for the rules-engine operation. The server may provide to the controller rules-engine output based upon the controller parameters and sensor values related to the controller parameters.

17 Claims, 3 Drawing Sheets

FRAMEWORK AND PROGRAMMING MODEL FOR EFFICIENT SENSE-AND-RESPOND SYSTEM

FIELD OF THE INVENTION

The invention relates to the field of sense-and-respond systems, and, more particularly, to a sense-and-respond system and related methods for mobile computing.

BACKGROUND OF THE INVENTION

It is now possible to collect large amounts of data in real-time from diverse sources due to the expanding number of sensors operating in the physical world. However, developers are faced with the problem of finding and receiving desired data from the physical world sensors because the data may be coming from diverse sources such as sensors from unrelated systems and reports such as weather information, traffic information, accident reports, and so forth.

Additionally, it is usually a requirement for an application's behavior to be easily adaptable to reflect today's rapidly changing business environments. Rule-based systems are useful in satisfying this requirement because application behavior may be changed by deploying new rules to a static application container. However, rule-based systems may have the drawback that they can be complex to develop and understand.

Rule-based systems typically offer a programming model based on condition/action pairs, which is a powerful abstraction for general rule-based applications. But in sensor-based applications where hardware and software systems are non-standard, developers may face a daunting variety of underlying hardware and software systems and programming models thereby making programs difficult to write and/or non-portable. For example, acquiring data from one kind of sensor system may be quite different from the same task with another kind of sensor system. Current sensor-based programming models assume a common underlying Operating System (OS), but this is a feasible assumption only when the sensor system is built from the ground up around a selected OS. Also, many rules require business data in their evaluation and thus rule programmers face the additional hurdle of writing code to acquire the necessary data.

A further challenge encountered is that since communications in such sensor environments are often low-bandwidth, and the acquisition of data from the sensors is usually an expensive operation, an unacceptable load on the system can be incurred if more than one application is consuming sensor data. In addition, when a rules-engine evaluates a rule at runtime, it may need to reference data that is coming from diverse input sources and may be refreshed at different periodic rates. As a result of the preceding limitations, current programming systems support only sense-and-respond systems in which the data acquisition is included in the scope of the application.

SUMMARY OF THE INVENTION

In view of the foregoing background, it is therefore an object of the invention to provide a system having a shared-inputs model that decouples data acquisition from data consumption and enables any data acquired to be used as input to multiple rules and for multiple users. Additionally, the system should provide condition detection that takes place "near" (in a network sense) the sensor technology, while the responding action is executed within an enterprise's computer systems.

This and other objects, features, and advantages in accordance with the invention are provided by a sense-and-response system that may include a server with a rules-engine. The server may receive sensor values for rules-engine operation from a plurality of sensors. The system may further include a controller that provides controller parameters to the server for the rules-engine operation. The server may provide to the controller rules-engine output based upon the controller parameters and sensor values related to the controller parameters. The controller may generate a controller response based upon the rules-engine output. Accordingly, a system having a shared-inputs model that decouples data acquisition from data consumption and enables any data acquired to be used as input to multiple rules is provided.

The server may include a registry of sensors in which each of the plurality of sensors is defined. The controller may further comprise a plurality of controllers and the server may further include a buffer in which each of the plurality of controllers is identified individually and in groupings who share common demands on the rules-engine.

The server may receive the sensor values by polling and/or as it becomes available. The controller may provide controller parameters that include at least one of controller location, controller velocity, controller time-stamp, and controller subscription information. As a result, a system with condition detection that takes place "near" (in a network sense) the sensor technology, while the responding action is executed within an enterprise's computer systems is provided.

The rules-engine of the server may define a plurality of condition/actions pairs which are triggered by the sensor values. The system may further include a plurality of controllers that subscribe to be notified by the server when a condition/actions pair is triggered.

Another aspect of the invention is directed to a sense-and-response method. The method may include receiving sensor values from a plurality of sensors for a rules-engine operation at a server, and providing controller parameters for the rules-engine operation from a controller to the server. The method may further include communicating rules-engine output based upon the controller parameters and sensor values related to the controller parameters from the server to the controller.

Yet a further exemplary aspect of the invention is a computer program product embodied in a tangible media. The computer program product includes computer readable program codes to receive sensor values from a plurality of sensors for a rules-engine operation at a server, provide controller parameters for the rules-engine operation from a controller to the server, and communicate rules-engine output based upon the controller parameters and sensor values related to the controller parameters from the server to the controller.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
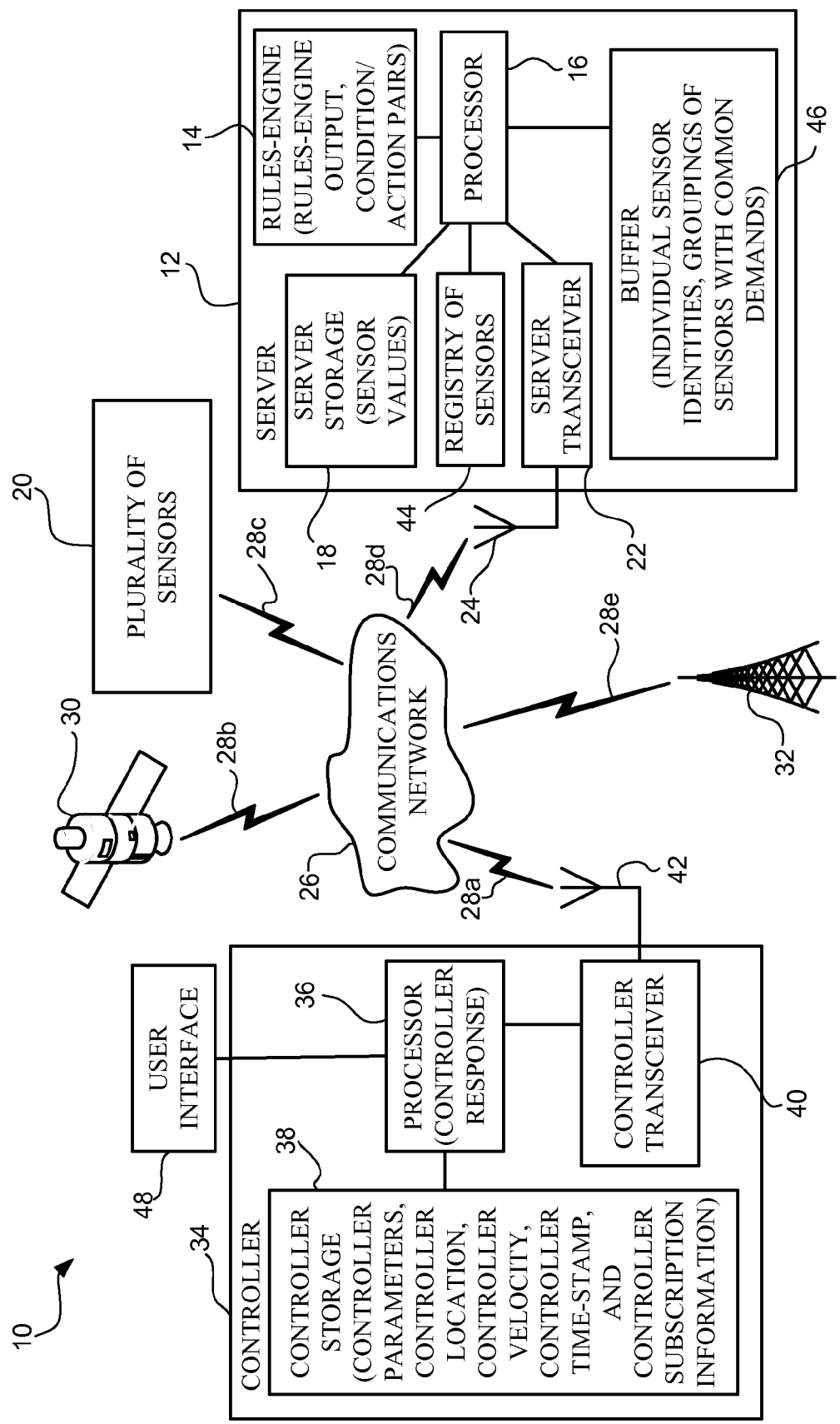
FIG. 1 is a schematic block diagram of a sense-and-respond system in accordance with the invention.

Referring initially to FIG. 1, a sense-and-respond system 10 is initially described. The system 10 includes a server 12 with a rules-engine 14, for example. The server 12 includes a server processor 16 or other logic circuitry which is connected to server storage 18, as will be appreciated by those of skill in the art. In other embodiments, the server storage 18 may be embedded in the server processor 16.

In one embodiment, the server 12 receives sensor values for rules-engine 14 operation from a plurality of sensors 20. The plurality of sensors 20 may include, but are not limited to, global positioning systems, weather sensors, traffic sensors, news links, proprietary system sensors, web links, virtual sensors, and the like. The server 12 communicates with external systems such as the plurality of sensors 20 via a server transceiver 22 and a server antenna 24 through a communication network 26, for example.

In one embodiment, the rules-engine 14 is a program that examines a series of rules in view of a given data set and seeks solutions consistent with the rules and data set. For instance, the application writer could say that they want to receive input events (sensor values) of type 'A near B'. This input event could then be combined with other input events and operators to construct a rule. The server 12 would generate event of type 'A near B' by asking for the lower level events needed as input for that and feeding those through a portion of the rules-engine 14 dedicated to spatial processing. The rules can be further defined with several additional descriptions such as input data, rule parameters, response application for each event, accessibility, and the like as will be appreciated by those of skill in the art. The rules-engine 14 may be a production/inference rules-engine, a reactive rules-engine, or the like.

A communication network 26 connects the other parts of system 10 through communication links 28a-28e as will be appreciated by those of skill in the art. The communication network 26 is a wireless network and/or a wired network and may use satellite 30 and network antenna 32.

The system 10 further includes a controller 34 that provides controller parameters to the server 12 for the rules-engine 14 operation, for example. In one embodiment, the controller 34 provides controller parameters that include controller location, controller velocity, a controller time-stamp, controller subscription information, and the like.

The controller 34 includes a controller processor 36 or other logic circuitry which is connected to controller storage 38 as will be appreciated by those of skill in the art. In other embodiments, the controller storage 38 may be embedded in the controller processor 36. Similar to the server 12, the controller 34 communicates with external systems such as the communication network 26 via a controller transceiver 40 and a controller antenna 42, for example.

In one embodiment, the server 12 provides to the controller 34 rules-engine 14 output based upon the controller parameters and sensor values related to the controller parameters. In another embodiment, the controller 34 generates a controller response based upon the rules-engine 14 output, and therefore the system 10 decouples data acquisition from data consumption. In one embodiment, the controller response generated by the controller 34 is provided on a user interface 48 for use by a person using the controller as will be appreciated by those of skill in the art.

In another embodiment, any data acquired by the server 12 may be used as input to multiple rules which may be accessed by multiple controllers 34. Consequently, multiple controllers 34 can use rules-engine 14 and rules-engine output according to each controller's requirement, which results in a shared-inputs model because the respond portion of system 10 (the controller respond) is isolated from the sense portion (the rules-engine output).

An example of a potential application of system 10 is for fleet tracking and logistics. An operator of a fleet of delivery vehicles may wish to track its vehicles' progress with respect to their schedules, and be alerted when a vehicle is more than a certain amount behind schedule. It may also wish to be alerted when a truck is returning empty to the warehouse so that it may begin preparing the truck's next load.

Another example of a potential application of system 10 is for use in public safety. A department of motor vehicles may like to automatically monitor compliance with posted speed limits (not applicable in all societies). Or, they may desire to simply monitor aggregate speeds and be alerted when speeds are too high for given weather conditions, or too low, indicating congestion.

Yet another example of a potential application of system 10 is for use in a road-use charges system. A municipality might like to assess road-use taxes based on zones and the time of day and the day of the week, and to notify drivers in real time of the current rate in effect.

Still yet another example of a potential application of system 10 is for use in location-based promotions. A marketing company handling promotions for certain establishments might like to be able to notify consumers as they approach those establishments with special promotions in effect at that time. It may want to send the promotions only to those who have accepted the service and who have been receptive to such promotions in the past, and it needs to avoid sending the promotion repeatedly.

The system 10 with its general-purpose, shared, infrastructure could support any and all of the above services, simultaneously, over a large set of controllers 34. Such a shared infrastructure would enable service providers to reach a broad customer base, without requiring a complete build out of their own infrastructure. As a result, with many services using a share infrastructure, no one service would have to bear the entire cost of building the extensive infrastructure necessary to support their services.

Another benefit offered by system 10 is that it enables developers to simply declare the input their rules require, as an input-type, entity pair, or an input-type, entity-group pair. All considerations of data acquisition mechanisms, including networks, data format, push (as it becomes available) vs. pull (polling), and all other low-level input source characteristics, are hidden. To provide this, the server 12 maintains a registry of sensors 44 (data input sources), recording the input types they provide and entity spaces that they supply input from thereby defining each of the plurality of sensors 20, for example. The registry of sensors 44 also records the characteristics of the input sources, such as whether the source pushes data into the rule system, or if it must be polled for the data. If polled, the source describes how frequently the data changes, so that excessive polling may be avoided. The server 12 also identifies which rules should be evaluated for the received input using an indexing scheme based on input type, entity, and entity-group.

Figure 2:
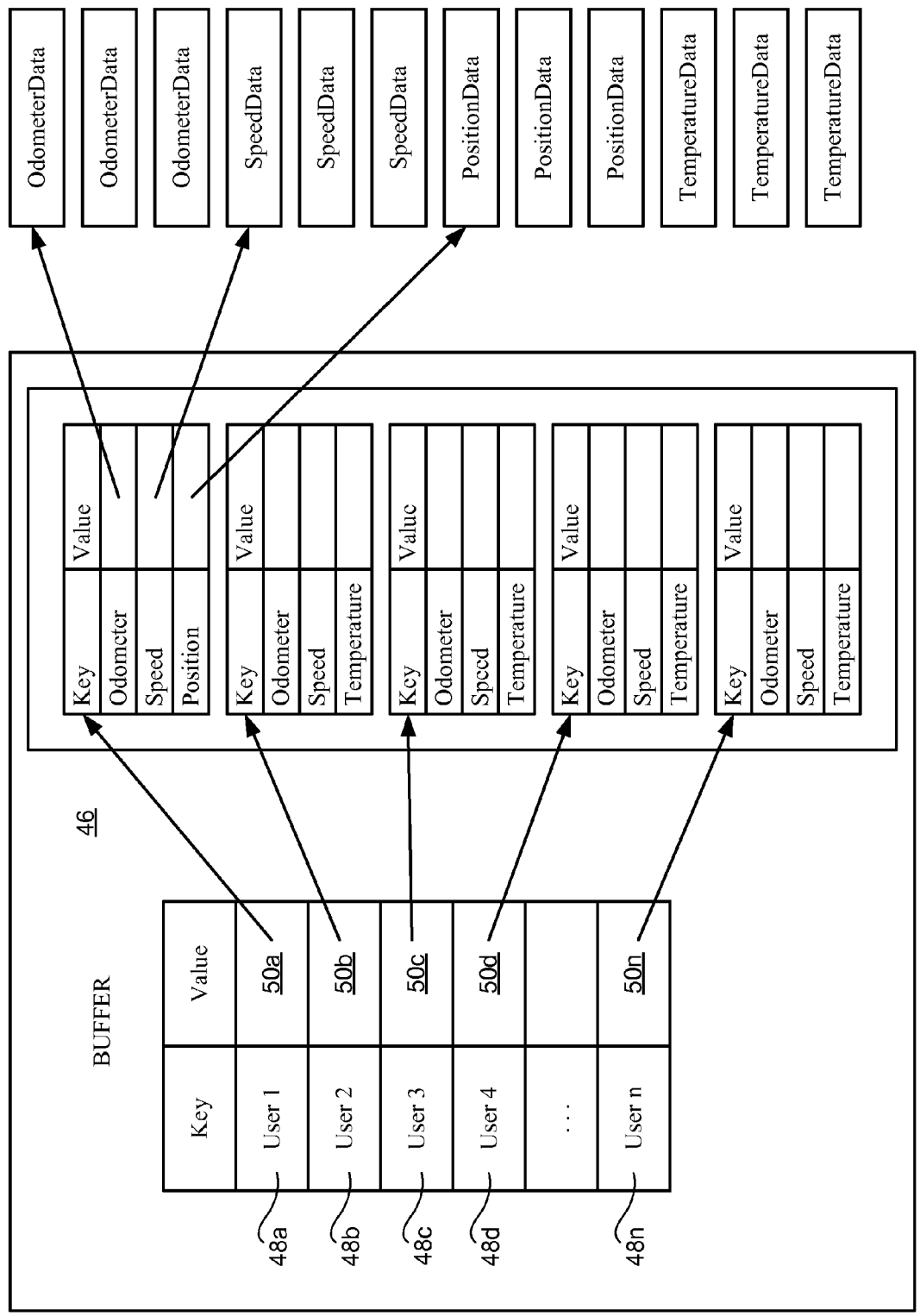
FIG. 2 is a schematic block diagram of the buffer illustrated in FIG. 1.

With additional reference to FIG. 2, the server 12 further includes a buffer 46 in which each of the plurality of sensors 20 is identified individually and in groupings that share common demands on the rules-engine 14, for example. The buffer 46 can provide required data for the rule engine 14, and this data is acquired by the plurality of sensors 20, for instance. In one embodiment, the buffer 46 may contain user name 48*a*-48*n*, data values 50*a*-50*n*, information about the data source, identification of the data source, identification of the session, and the like.

In another embodiment, the buffer 46 maintains up-to-date data and open connections to the rule engine 14. In this way the rule engine 14 may readily retrieve from the buffer 46 the data to evaluate a rule.

The buffer 46 is a multi-level hash table and has a first level of entries indexed by a controller ID and a controller-group ID, for example. Each controller ID and each controller-group ID referenced in a rule has an entry. Each of these entries is itself a hash table, indexed by input type name. In another embodiment, the buffer 46 entries are created when a rule subscription is received. At this time empty input-data objects are also created, in order to avoid excessive object creation during rule evaluation, for instance.

The buffer 46 also addresses two other issues. The first is that to avoid costly searches for data at evaluation time, a structure of shared pointers is used so that input data is only copied into the buffer once, and rules access it from there directly, without further searching or copying. The second is that any item of input data may be referred to in a rule in multiple ways, because the entity that is the source of the data may be referred to by its ID or by a group to which that entity may belong. Therefore the buffer 46 provides a buffer location for not only an individual entity's data values, but also for each group known to the system 10. When data arrives, it is copied both to the entry for the individual entity it is from, but also to all groups to which the entity belongs.

The buffer 46 is also important in decoupling the arrival of input from rule evaluation, for instance. This decoupling enables the system 10 to trigger rule evaluation immediately, or to pace rule evaluation when input data arrives too frequently, for example. It may also allow the system 10 to manage the case where rules require inputs that arrive at different rates.

In one embodiment, the rules-engine 14 of the server 12 defines a plurality of condition/actions pairs which are triggered by the sensor values. In another embodiment, the system 10 further includes a plurality of controllers 34 that subscribe to be notified by the server 12 when a condition/actions pair is triggered.

Figure 3:
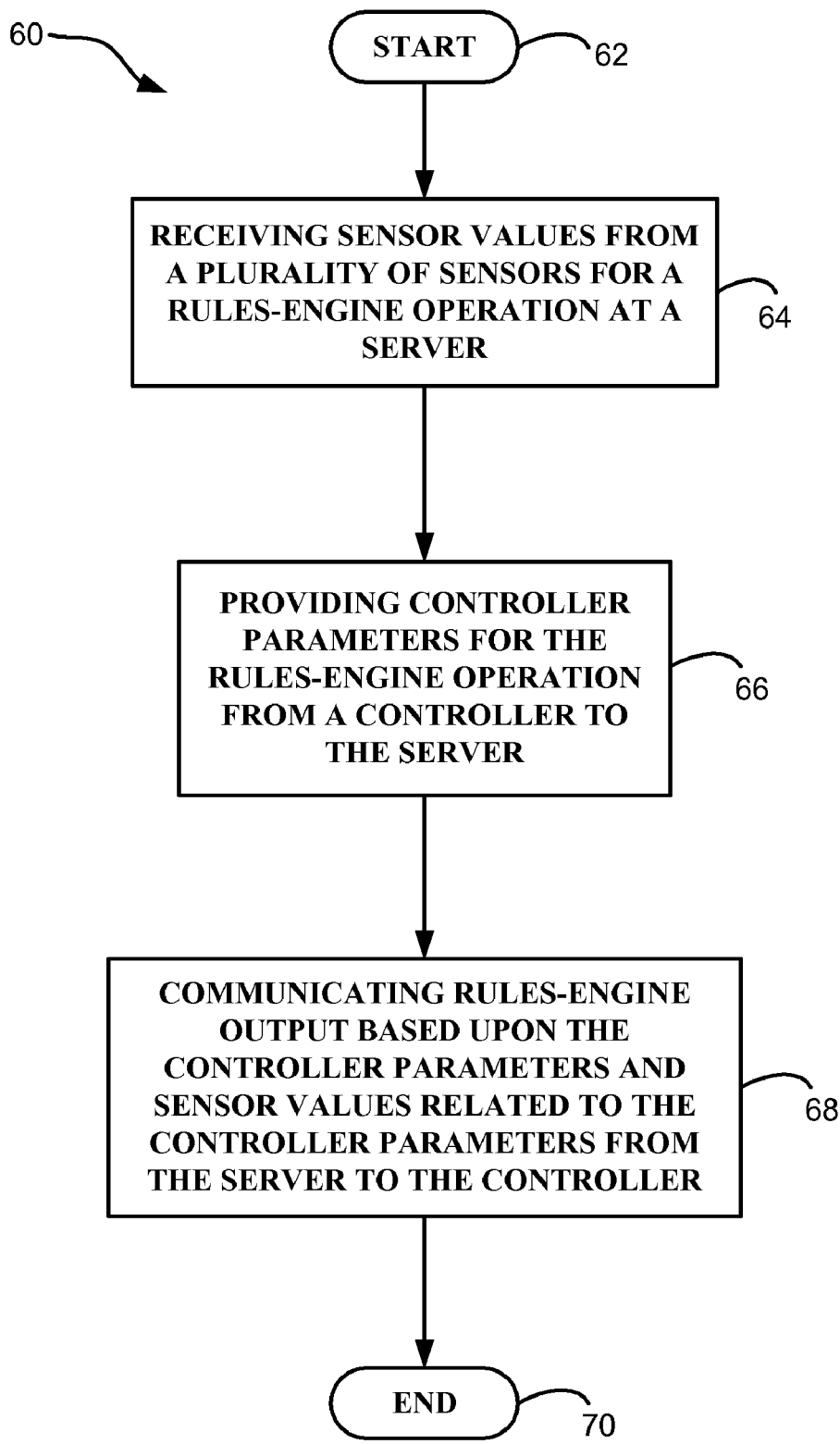
FIG. 3 is a flowchart illustrating method aspects according to the invention.

Another aspect of the invention is directed to a sense-and-response method, which is now described with reference to flowchart 60 of FIG. 3. The method begins at Block 62 and may include receiving sensor values from a plurality of sensors 20 for a rules-engine 14 operation at a server 12 at Block 64. The method may further include providing controller parameters for the rules-engine 14 operation from a controller 34 to the server 12 at Block 66. The method may also include communicating rules-engine 14 output based upon the controller parameters and sensor values related to the controller parameters from the server 12 to the controller 34 at Block 68. The method ends at Block 70.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A sense-and-response system comprising:
   a server including a rules-engine, said server receiving sensor values for the rules-engine operation from a plurality of sensors; and
   a controller that provides controller parameters to said server for the rules-engine operation;
   said server providing to said controller rules-engine output based upon the controller parameters and sensor values related to the controller parameters, and said controller generates a controller response based upon the rules-engine output.

2. The system of claim 1 wherein said server includes a registry of sensors in which each of the plurality of sensors is defined.

3. The system of claim 1 wherein said controller comprises a plurality of controllers; and said server includes a buffer in which each of the plurality of controllers is identified individually and in groupings who share common demands on the rules-engine.

4. The system of claim 1 wherein said controller provides controller parameters that include at least one of controller location, controller velocity, controller time-stamp, and controller subscription information.

5. The system of claim 1 wherein said server receives the sensor values by at least one of polling and as it becomes available.

6. The system of claim 1 wherein the rules-engine of said server defines a plurality of condition/actions pairs which are triggered by the sensor values.

7. The system of claim 6 further comprising a plurality of controllers that subscribe to be notified by said server when at least one condition/actions pair is triggered.

8. A sense-and-response method comprising:
   receiving sensor values from a plurality of sensors for a rules-engine operation at a server;
   providing controller parameters for the rules-engine operation from a controller to the server;
   communicating rules-engine output based upon the controller parameters and sensor values related to the controller parameters from the server to the controller; and
   generating a controller response based upon the rules-engine output at the controller.

9. The method of claim 8 further comprising defining the plurality of sensors in a registry in communication with the server.

10. The method of claim 8 further comprising providing a plurality of controllers and identifying in a buffer each of the plurality of controllers individually and in groupings who share common demands on the rules-engine.

11. The method of claim 8 further comprising receiving the sensor values at the server by at least one of polling and as it becomes available.

12. The method of claim 8 further comprising defining for a rules-engine a plurality of condition/actions pairs triggered by the sensor values.

13. The system of claim 12 further comprising notifying the plurality of controllers when at least one condition/actions pair is triggered based upon a subscription between the plurality of controllers and the server.

14. A computer program product embodied in a tangible media comprising:

computer readable program codes coupled to the tangible media for a sense-and-response method, the computer readable program codes configured to cause the program to:

receive sensor values from a plurality of sensors for a rules-engine operation at a server;

provide controller parameters for the rules-engine operation from a controller to the server;

communicate rules-engine output based upon the controller parameters and sensor values related to the controller parameters from the server to the controller; and generate a controller response based upon the rules-engine output at the controller.

15. The computer program product of claim 14 further comprising program code configured to: define the plurality of sensors in a registry in communication with the server.

16. The computer program product of claim 14 further comprising program code configured to: provide for a plurality of controllers and to identify in a buffer each of the plurality of controllers individually and in groupings who share common demands on the rules-engine.

17. The computer program product of claim 14 further comprising program code configured to: receive the sensor values at the server by at least one of polling and as it becomes available.

* * * * *